(12) United States Patent
Hwang et al.

(10) Patent No.: US 8,540,794 B2
(45) Date of Patent: Sep. 24, 2013

(54) METHOD FOR REDUCING IRON OXIDE AND PRODUCING SYNGAS

(76) Inventors: Jiann-Yang Hwang, Chassell, MI (US); Xiaodi Huang, Houghton, MI (US)

( * ) Notice: Subject to any disclaimer, the term of this patent is extended or adjusted under 35 U.S.C. 154(b) by 557 days.

(21) Appl. No.: 11/906,761

(22) Filed: Oct. 3, 2007

(65) Prior Publication Data

US 2008/0087135 A1    Apr. 17, 2008

Related U.S. Application Data

(63) Continuation-in-part of application No. 11/220,358, filed on Sep. 6, 2005, now abandoned.

(60) Provisional application No. 60/849,098, filed on Oct. 3, 2006, provisional application No. 60/865,672, filed on Nov. 14, 2006, provisional application No. 60/607,381, filed on Sep. 3, 2004, provisional application No. 60/607,140, filed on Sep. 3, 2004.

(51) Int. Cl.
*C22B 9/22* (2006.01)
*C22B 1/216* (2006.01)
*C21C 5/38* (2006.01)

(52) U.S. Cl.
USPC ........... 75/10.13; 266/144; 266/145; 266/173

(58) Field of Classification Search
None
See application file for complete search history.

(56) References Cited

U.S. PATENT DOCUMENTS
6,277,168 B1    8/2001   Huang et al.
2004/0060387 A1    4/2004   Tanner-Jones et al.

FOREIGN PATENT DOCUMENTS
JP    06-116616    4/1994
WO    WO 89/04379    * 5/1989

* cited by examiner

*Primary Examiner* — Milton I Cano
*Assistant Examiner* — Sarah A Slifka
(74) *Attorney, Agent, or Firm* — John R. Benefiel (57) ABSTRACT

A method and apparatus for reducing iron oxides using microwave heating in a furnace chamber which is sealed against the entrance of air reduces the energy required and produces a low temperature reduction and allows the recovery of combustible synthetic gas as a byproduct of the process. Avoidance of the reduction of sulfur, phosphorus and silica is also insured, as is the need to reduce the silica content of the feed material prior to reducing the ore. A continuous rotary hearth furnace, a rotary kiln, a linear conveyor and vertical shaft furnace chamber configurations are described. A secondary heating zone can also be included to process the reduced iron into iron nuggets or liquid metallic iron.

5 Claims, 6 Drawing Sheets

METHOD FOR REDUCING IRON OXIDE AND PRODUCING SYNGAS

CROSS REFERENCE TO RELATED APPLICATIONS

This application claims the benefit of U.S. provisional patent application Ser. No. 60/849,098 filed on Oct. 3, 2006 and Ser. No. 60/865,672 filed on Nov. 14, 2006, and is a continuation in part of U.S. patent application Ser. No. 11/220,358 filed on Sep. 6, 2005, now abandoned, which claimed the benefit of U.S. provisional patent application Ser. No. 60/607,381 filed on Sep. 3, 2004 and U.S. provisional patent application Ser. No. 60/607,140 filed on Sep. 3, 2004.

BACKGROUND OF THE INVENTION

Currently steel is produced by two types of operations: integrated mills and minimills. In the integrated mill, sintered iron ore pellets, coke and lime are charged into a blast furnace (BF). Air is blown in at high speed to combust the coke to generate carbon monoxide and heat. Sintered iron ore pellets are reduced to hot metal by the carbon monoxide and melted to form liquid iron. The liquid iron is then sent to a basic oxygen furnace (BOF) where pure oxygen is blown into the liquid iron to remove excessive carbon and convert iron into steel. The fundamental problems associated with this production route are the needs for coke and intense high temperature combustion. Coke making is one of the most polluting of industrial processes and high temperature combustion generates a great amount of dust and wastes energy in the exhaust gases.

Minimills employ electric arc furnaces (EAF) to melt steel scrap with or without DRI (Direct Reduced Iron) and produce generally lower quality steel. Minimills traditionally enjoyed an abundant supply of steel scrap, however, the recent strong demand for scrap internationally has doubled the price. DRI prices have also significantly increased due to high cost of reformed natural gas, causing many DRI plant closings.

A revolutionary steelmaking technology has been developed by the present inventors based on the use of microwave energy (U.S. Pat. No. 6,277,168). This technology can produce DRI, iron or steel from a mixture, consisting of iron oxide fines, powdered carbon and fluxing agents. This technology is projected to eliminate many current intermediate steelmaking steps, such as coking, sintering, BF ironmaking, and BOF steelmaking.

This technology has the potential to save up to 50% of the energy consumed by conventional steelmaking; dramatically reduce the emission of $CO_2$, $SO_2$, NOx, VOCs, fine particulates, and air toxics; substantially reduce waste and emission control costs; greatly lower capital cost; and considerably reduce steel production costs.

Microwave heating technology has the advantage over blast ovens relying on combustion in being faster to heat the iron oxide feed materials since it does not rely on conducting heat into the material through air or other gases but rather it generates heat internally directly by absorbing the microwave radiation. Furthermore, microwave heating is selective, i.e., it only heats components of the material that needs to be heated, i.e., to reduce the hematite or magnetite and does not heat the silica, phosphorus, sulfur or other non ferrous components of the feed material directly, so that the energy is much more efficiently used and the maximum temperature reached can be much lower. The feed material does not need to be electrically conductive to be heated with microwave radiation in being reduced.

Another problem with iron and steel making has been the retention of sulfur and phosphorus in the iron which may reduce the quality of the iron or steel produced. This problem results from the much higher temperatures typically reached in conventional reducing of iron oxide by combustion of natural gas or coal. These higher temperatures result since the outside of the pellets or green balls or other feed material is raised to a temperature much higher than needed to carry out reduction because of the need to achieve proper heating throughout the entire pellet or ball and to reduce the time required to raise the entire mass to the level required for reducing the iron oxide. At these higher temperatures, phosphorus and sulfur are also reduced and this results in elemental phosphorus and sulfur being retained in the iron or steel. This problem is exacerbated if coal is used to reduce the ore or other feedstock since coal sometimes contains sulfur, and this would further increase the level of sulfur in the iron.

A further problem resulting from the high temperatures required in conventional reduction processes is that expensive refractory material must be employed in the furnace increasing the capital costs. Also, any silica present may also be reduced, which will also contaminate the iron and have a deleterious effect on its quality in many cases.

Another problem encountered concerns excess silica being present in the feed material either from the mining operations or in the ore deposits. Silica content varies in iron ore from different deposits. While silica will be eliminated by being part of the slag forming on molten metal, if excessive slag forms this will block attempts to inject a gas into the molten metal and thus interfere with the process. Thus, in instances where excessive silica is present in the ore or the pellets, the silica content must first be removed or at least minimized. This has heretofore required grinding of the ore into a very fine powder in order to mechanically separate the silica from the ore, a quite costly process representing a major expense item and energy consumer in processing such ore. In fact, too high levels of silica can render some ores commercially worthless.

Another disadvantage arises from the air injection of conventional practice and blast heating to reduce iron ore as this generally results in combustion of all the carbon associated with the feed material into carbon dioxide. This represents a waste of potentially useful carbon combustibles and adds to the carbon "footprint" of the process.

It is the object of the present invention to provide apparatus and methods for the production of metals and in particular iron and steel which utilize microwave heating in such a way to realize the potential benefits of using microwave heating in iron and steel production.

It is yet another object of the present invention to recover carbon combustibles involved in the reduction process in a useful form.

It is a further object of the present invention to avoid contamination of iron during production with phosphorus, sulfur or silica using a minimum energy and at a lower cost.

It is still a further object of the invention to separate silica from the ore at a minimum consumption of energy.

SUMMARY OF THE INVENTION

The above recited objects and other objects which will be understood upon a reading of the following specification and claims are accomplished by carrying out the reduction phase of iron oxide at a relatively moderate temperature by the use of microwave radiation while excluding air. The microwave radiation heats only the iron containing constituents of the feed material for maximum efficiency in the use of energy and the moderate temperatures avoid reduction of phosphorus, sulfur or silica present to minimize contamination of the iron with those elements.

Volatile gases from coal and carbon combustibles are produced and can be recovered for use as a fuel or as a reducing gas.

Continuous processing at moderate temperatures becomes practical due to the speed of microwave heating of the material to reach reduction temperatures. According, to the invention, feed materials may be reduced in a rotary hearth furnace, a linear conveyor furnace, a rotary kiln, or in vertical shaft furnaces which each enable multiple microwave wave guide mountings to readily achieve the necessary heating capacity for a given application. The DRI produced can be discharged into a collecting container or directly into an electric arc furnace for producing steel. The microwave heating reduction may be combined with a secondary heating of the reduced ore (DRI) to obtain iron nuggets. An induction melting furnace to produce liquid iron can also be used to receive the DRI.

The rotary kiln (and all of the other furnaces can utilize a combination of microwave and combustion heating to produce DRI or solely by multiple microwave sources.

A linear conveyor associated with a conveyor can produce either DRI or iron nuggets with secondary heating after the reduction phase which may also be accomplished with microwave heating or by burner heating, radio frequency radiation, etc.

A vertical shaft furnace can also be used in which the ore pellets or other feed material is introduced at the top of a refractory lined cylinder. Microwave heating is carried out as the material descends down the furnace. An induction heater may be provided at the bottom which receives DRI and produces melted iron discharged therefrom and slag is drawn off from the melted iron. Alternatively, injection of natural gas or other reducing gas can be done to produce DRI in the shaft furnace without carbon material in the feed material.

The use of microwave energy to reduce the feed materials allows reduction to be carried out at lower a temperature since the entire mass is heated at once such that overheating of any portion is not necessary.

If the phosphorus and sulfur remain as oxides in the feed material, they form part of the slag when the reduced feed material is melted and are thereby eliminated from the metal with the slag.

Continuous processing is rendered easier by using microwave energy to reduce the feedstock while avoiding any problem with retention of sulfur and or phosphorus.

By microwave heating at lower temperatures, reduction of silica is minimized. However, the major benefit of the approach is that gas injection is not required such that a reduction of silica in the slag by a mechanical removal of the silica prior to processing is not required. Even relatively large quantities of silica can be removed in the slag and need not be removed by costly fine grinding and mechanical separation as practiced conventionally to reduce silica content prior to reduction of the ore.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Referring to the drawings and particularly FIGS. 1-5, a rotary hearth furnace 10 according to the present invention is depicted. This comprises a stationary annular upper chamber 12 having outer walls 14 of a refractory insulating material and an inner skin 16 of stainless steel attached to embedded anchors 17 in the refractory walls 14. A rotating base assembly 18 supports a ring shaped hearth 20 which is rotated beneath the stationary annular chamber 12 by a motor—right angle drive 24 and chain 26. A series of main rollers 27 are mounted on a base plate 21 and beneath a support plate 23 rotatable about a pivot 25. A series of inside and outside secondary rollers 29 attached to brackets 29A transfer the weight of the upper chamber 12 onto bracket flanges 31 on the base assembly 18.

Figure 1:
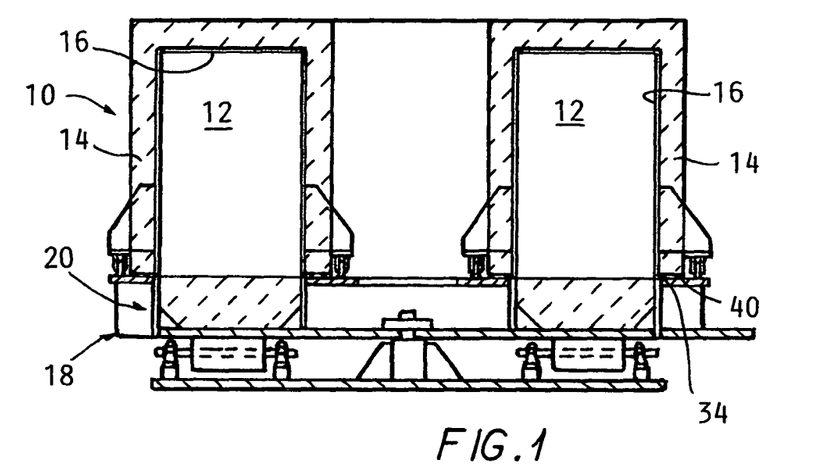
FIG. 1 is a diagrammatic sectional view through a rotary hearth furnace and related components according to the present invention.
Figure 1A:
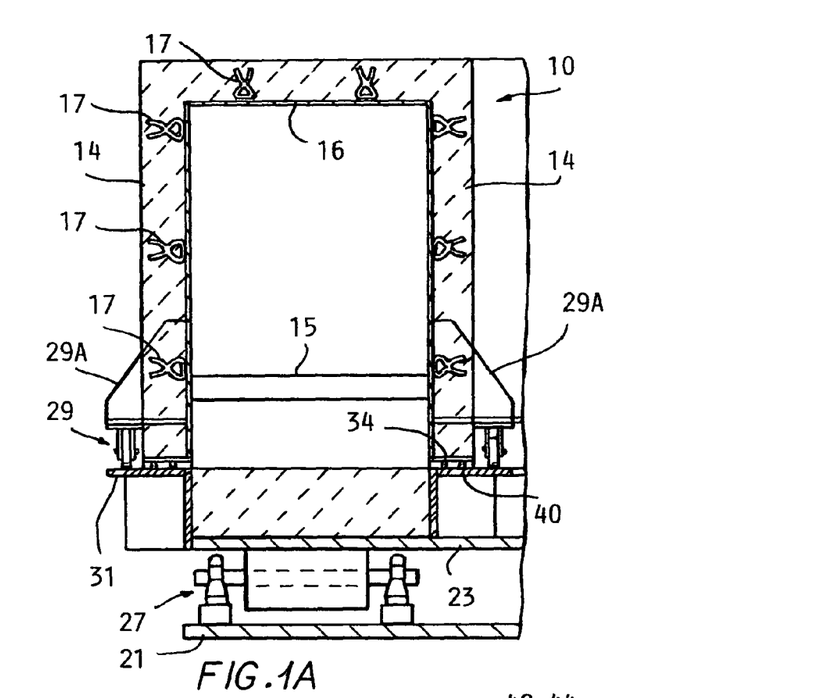
FIG. 1A is an enlarged view of a section taken through one side of the rotary hearth furnace showing constructional details.

A refractory material hearth base 22 holds a hearth layer of such material such as silica, limestone etc. dispensed from a feed opening 28. Feedstock material is dispensed onto the hearth layer through a dispenser 30. Such feed material may include iron ore pellets admixed with ground coal or other carbonaceous material to supply carbon for reduction of the ore, and other components to form "green" balls in the well known manner, creating a bed of feed material on the hearth base 22. Flux, binders and other components are used to create such feed material. Cross pipes 15 can be included to reinforce the chamber 22 particularly during shipping.

Figure 2:
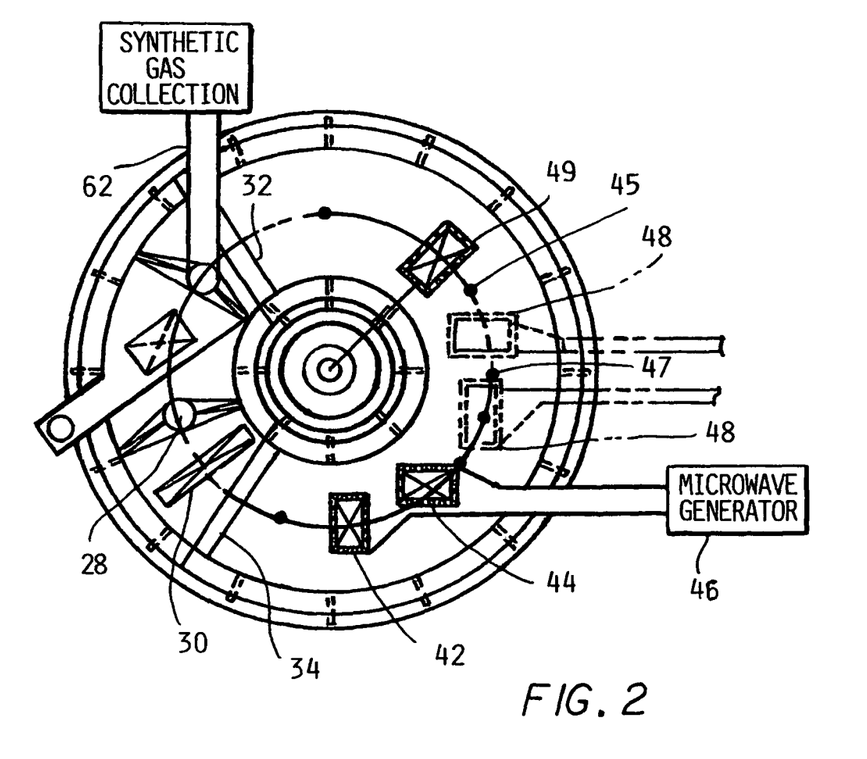
FIG. 2 is a diagrammatic plan view of the rotary hearth furnace shown in FIG. 1.
Figure 3:
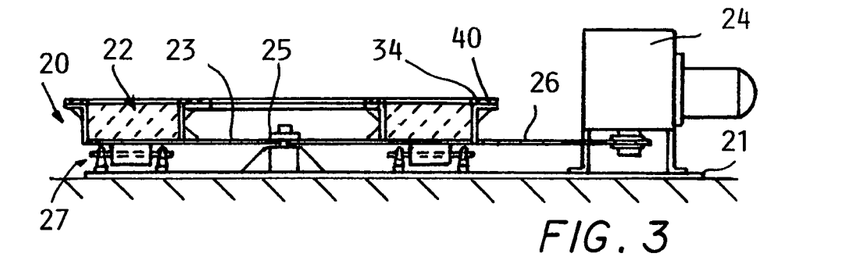
FIG. 3 is a view of a vertical section through the rotating base of the rotary hearth furnace of FIGS. 1 and 2.
Figure 4:
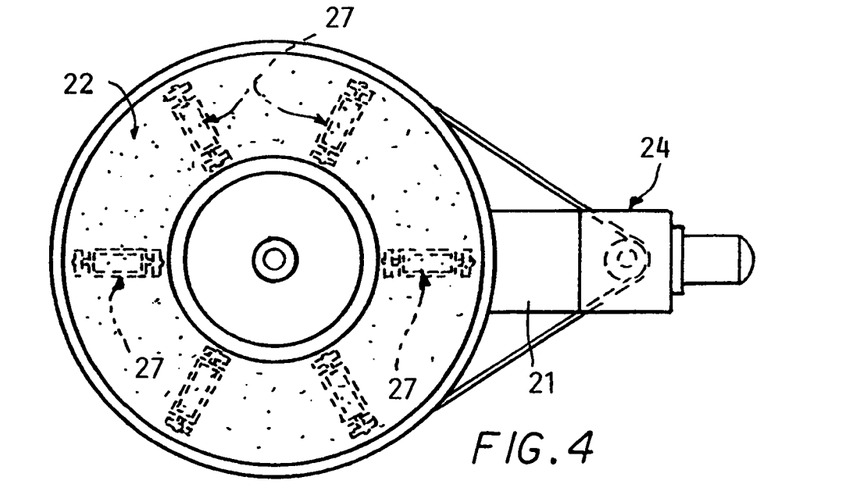
FIG. 4 is a plan view of the rotating base shown in FIG. 5.

Refractory divider walls 32, 34 of refractory material define a furnace reduction subchamber 36 within the annular chamber 12 wherein the reduction of the iron oxide feed material takes place.

A refractory rope air seal 38 resting on bracket flange 31 encircles the rotating hearth structure 20 to prevent air from entering the chamber 12 and a metal rope microwave seal 40 prevents the escape of microwaves during operation. Similar seals are provided at the material charge and discharge ports for air and microwave sealing.

Microwaves from a generator 46 are introduced into the annular chamber 12 through a pair of waveguides 42, 44 which are preferably oriented at 90° to each other to create homogeneous microwave distribution in chamber 12.

A microwave "stirrer" blade (not shown) can also be included for even greater homogeneousness of the microwave irradiation.

Additional waveguides 48 can be employed if greater power is required for a particular application.

A viewing window 49 is also provided.

The power level is set to raise the temperatures to that at which reduction will occur i.e., approximately 600-1200° C., which as discussed above is much lower than the temperatures in excess of 1600° C. reached in conventional combustion reducing processes.

It will be understood by those skilled in the art that one or more pyrometers 45 and gas probes 47 will be used to monitor the process conditions for control and safety reasons.

The speed of microwave heating is much greater than combustion heaters since the microwave radiation heats the material from the inside and only heats the iron bearing material (not the silica). Thus, a continuous process operated at relatively low temperatures is made practical.

Figure 5:
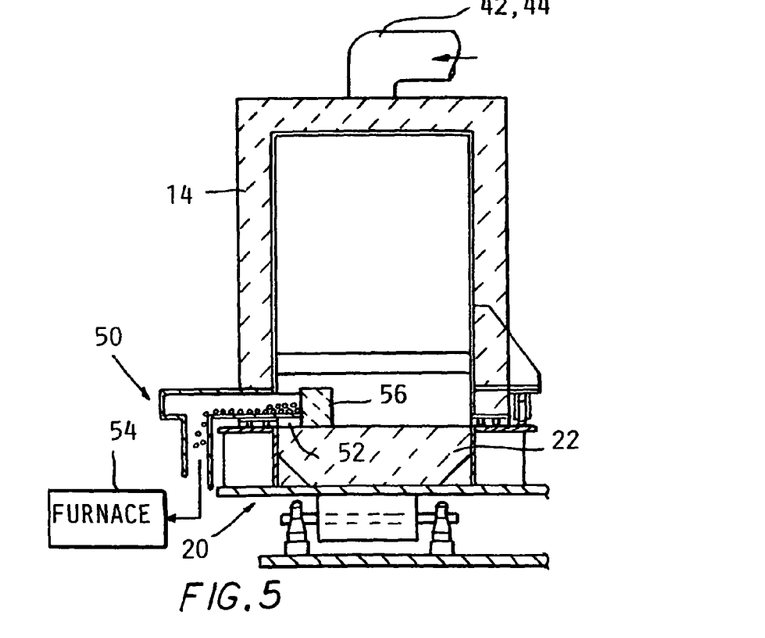
FIG. 5 is an enlarged view of a section taken through one side of the rotary furnace shown in FIG. 1 showing a DRI discharge and microwave guide.

The feed material is reduced to direct reduced iron (DRI) by this heating in the present of carbon and then moved to a discharge port and chute 50 (FIG. 5). A steel plow (or screw) 52 causes the DRI to be discharged through the port so where it is collected in a container 54 for further processing.

A refractory guide block 56 may be used to adjust the width and depth of feed material on the hearth 22.

Figure 6:
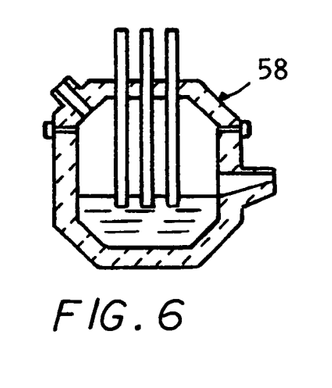
FIG. 6 is a vertical section through an electric arc furnace alternatively receiving the DRI for melting.

As shown in FIG. 6, the DRI may alternatively be directly discharged into an electric arc furnace 58 for the production of steel from the DRI.

Figure 7:
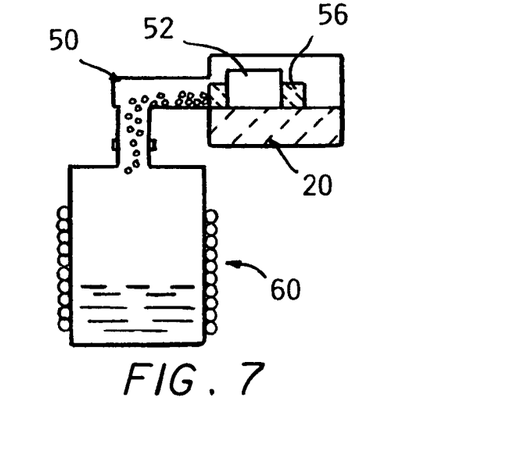
FIG. 7 is a diagrammatic view of a vertical section through an induction melting furnace arranged to receive the DRI discharge.

As another alternative shown in FIG. 7, the DRI may be discharged into an induction melting furnace 60 with discharge ports for liquid metal and slag (not shown). A liquid bath must first be formed using iron prior to initiating the process using DRI.

Figure 8:
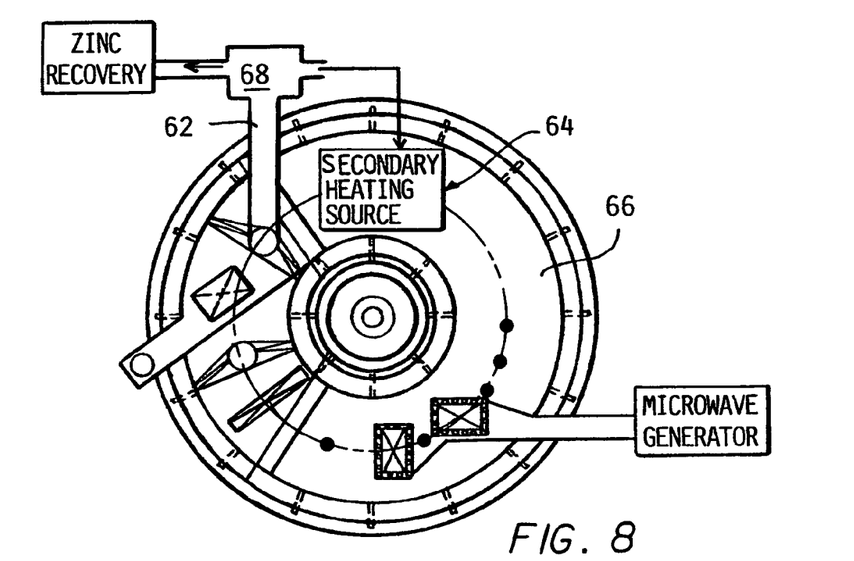
FIG. 8 is a diagrammatic plan view of an alternate form of rotary hearth furnace according to the invention and showing components for recovery for synthetic gas.

FIG. 8 shows an alternative embodiment in which a secondary heating source 64 is provided in order to increase the DRI temperature about 200° C. in a secondary heating zone 68 within the chamber furnace. This temperature increase along with a proper recipe of the feed material and the hearth layer material can produce iron nuggets as the end product.

The secondary heating source could include microwave radiation but microwave absorbing material such as carbon must be added, as the DRI material does not absorb microwave energy. Other heating means could be employed. As discussed above, since the furnace chamber 12 is sealed, preventing air from entering, volatile components of coal (primarily methane) gassed off and the carbon monoxide generated from the carbon reducing the iron oxides by the lower temperature reduction process can be collected via a discharge duct 62 (FIG. 8) for use elsewhere. That gas can be used to fuel a burner (not shown) comprising the secondary heat source after removal of dust by a cleaning system such as a bag house 68.

The dust can contain byproducts such as zinc or zinc oxide which may be recovered as indicated.

Figure 9:
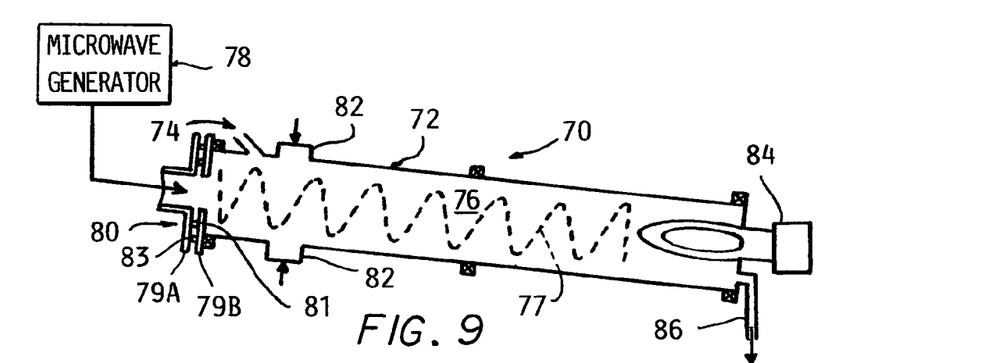
FIG. 9 is a diagrammatic section view of a rotary kiln version of a microwave heated reduction furnace according to the invention.

FIG. 9 shows a rotary kiln 70 embodiment of the invention in which a cylindrical housing 72 is rotatably mounted and driven with its axis inclined shallowly from the horizontal.

The feed material (iron ore pellets with coal) is loaded via a charging port 74 into the furnace chamber 76 defined in the housing 72. Microwave radiation from a generator 78 is introduced via a longitudinally aligned waveguide 80. Mating flanges at 77, 79 have interposed microwave and air seals 81, 83. Additional waveguides can be provided on the side via microwave transparent windows 82 (which can be constructed of a refractory material). A burner 84 can augment the heat of the microwaves to produce DRI discharged at discharge port 86.

An auger device 77 may also be provided to assist movement of the feed material.

Figure 10:
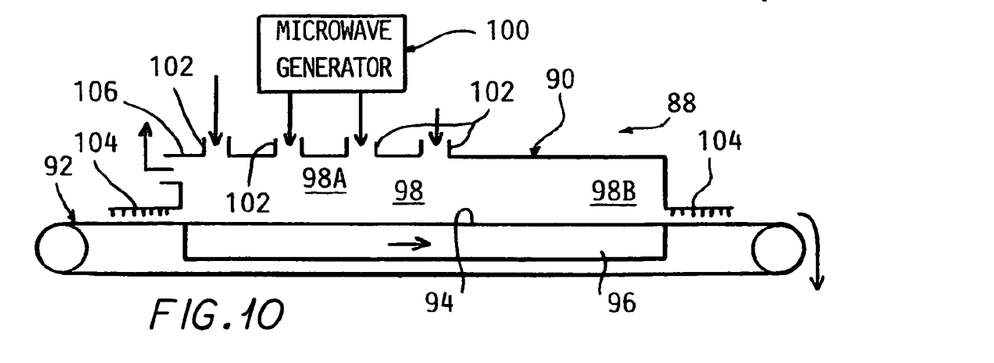
FIG. 10 is a diagram of a conveyor or traveling grate embodiment of a furnace chamber according to the present invention with secondary heating.

FIG. 10 shows a linear conveyor furnace 88 in which a furnace chamber defining structure 90 has an endless conveyor 92 (which can be comprised of a traveling grate) with an upper run 94 extending beneath it supported on a support structure 96. Feed material is loaded at one end and carried into a furnace chamber 98.

Furnace chamber 98 has a primary zone 98A irradiated by microwaves radiation from a generator 100 introduced via wave guides 102.

In a secondary zone 98B further heating of the reduced iron is carried out, as by radio frequency radiation, burners, etc., which can optionally be provided to produce iron nuggets. The DRI or iron nuggets are off loaded at the other end of the conveyor 92.

Microwave seals 104 are comprised of an array of steel bars or rods, spaced apart in a pattern which will block microwave leakage through the end openings by well known techniques.

Furnace gas can be collected through duct 106.

A screw conveyor 105 may be employed to assist in advance of the feed material.

Figure 11:
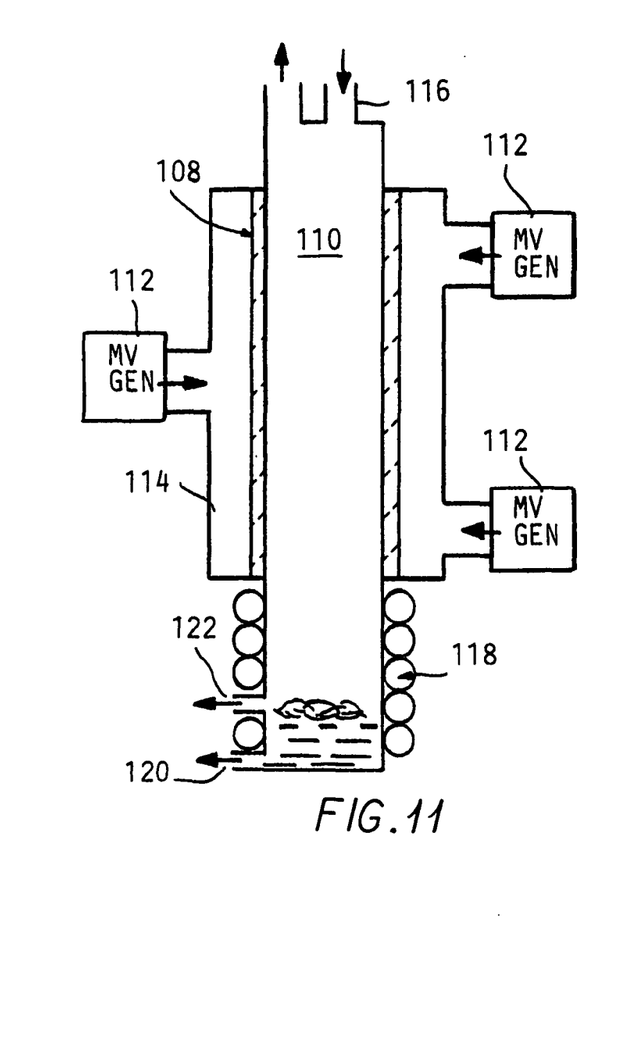
FIG. 11 is a diagram of a vertical shaft furnace chamber according to the present invention.

FIG. 11 shows a vertical shaft embodiment of the invention, in which a tubular housing 108 defines a furnace chamber 110. The housing 108 can be constructed of a steel grille cover with a refractory shell, allowing penetration of microwaves from generators 112 directed through an outer enclosure 114.

Feed material such as pellets or a mixture as described is fed into a charging port 116.

An induction heater 118 at the lower end of furnace chamber 108 receives the DRI produced by the microwave heating in the upper region of the chamber 100 and heats it sufficiently to produce molten iron discharged at port 120. Slag is discharged at the top through port 122.

The synthetic gas produced is discharged at the top through port 124.

Figure 12:
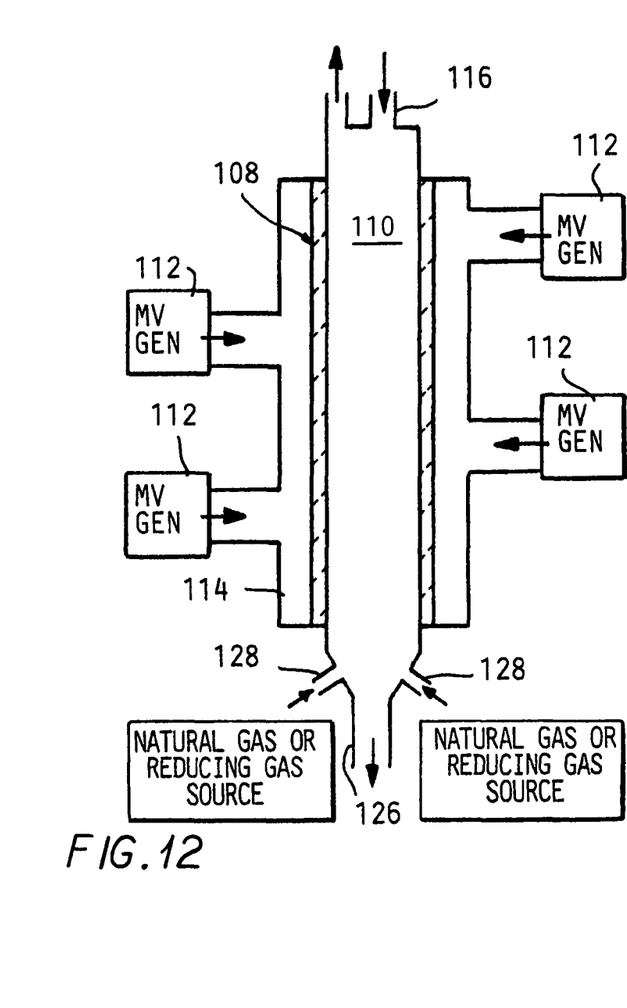
FIG. 12 is a diagram of an alternate form of vertical shaft furnace chamber according to the present invention.

FIG. 12 shows a variation in which DRI is discharged via a bottom opening 126.

The DRI can be produced without carbon in the feed material by injecting natural or other reducing gas into bottom ports 128.

Figure 13:
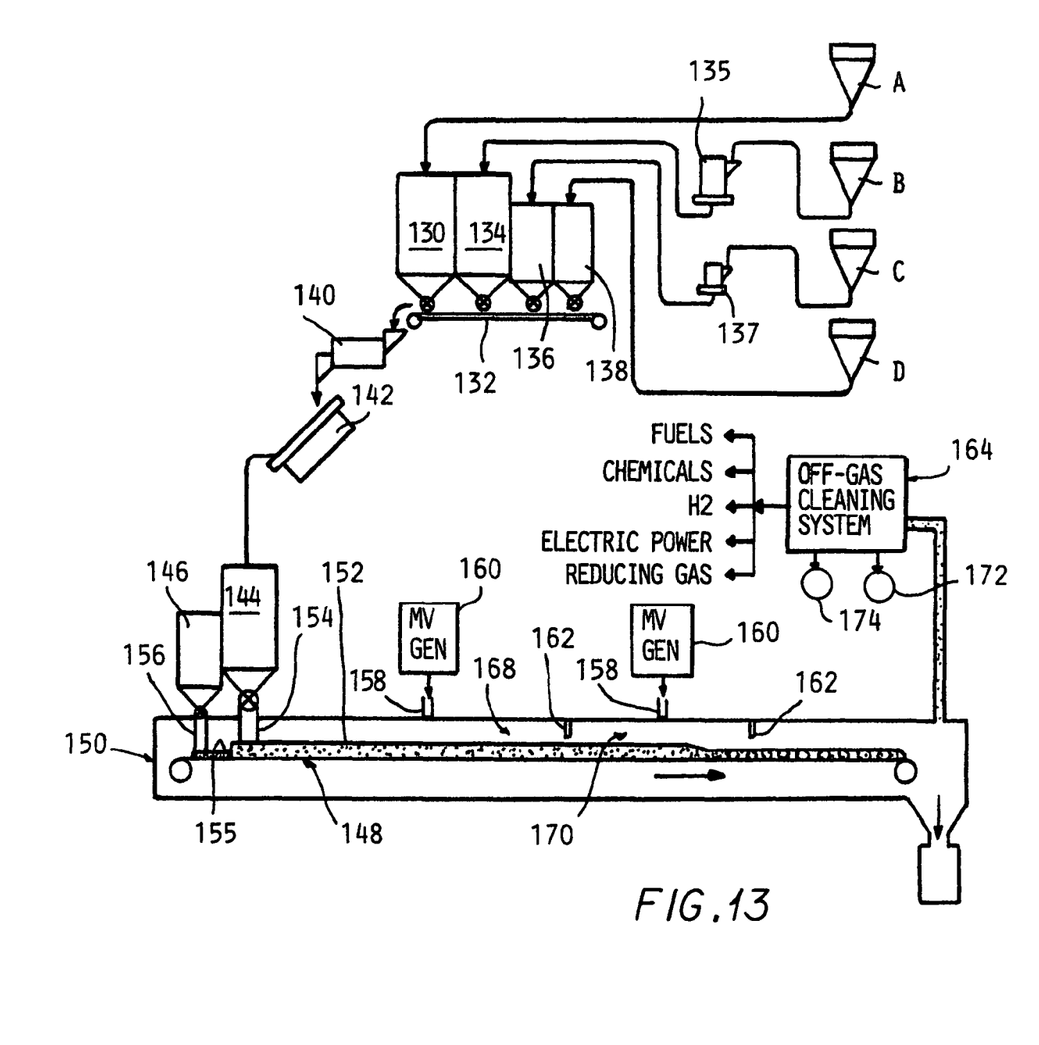
FIG. 13 is a diagrammatic depiction of an overall installation according to the present invention.

FIG. 13 illustrates an integrated apparatus for concurrent production of steel and syngas. Coal is used as both reducing agent and gasification material.

Ore from a source A is loaded into a first dispenser 130 positioned over a conveyor 132, coal from a source B into a second dispenser 134, (via a pulverizer 135) additives such as flux from source C into a third dispenser 136 (via a pulverizer 137), and binder from source D in a fourth dispenser 138. The conveyor discharges all of these materials into a mixer which discharges the mixed ingredients into a pulverizer 142 which in turn charges a dispenser 144. Carbon particles are also deposited in a layer onto a conveyor 148 by a second dispenser 146.

A rotary conveyor or traveling grate 148 is disposed in a sealed housing 150 (the conveyor perimeter shown in FIG. 13 is developed into a straight line).

The pellets are dispensed to form a bed 152 on top of a carbon particle bed 155 on the conveyor 148 via a charging port 154. The carbon particles are deposited onto the conveyor 148 via a charging port 156.

An organic binder is used to agglomerate iron ore concentrate, pulverized coal and fluxing agent into pellets. The feed material is dispensed onto the conveyor 148 in a layer leveled by the lower end of the dispenser 154 and is transported from the entrance to the exit of the furnace chamber 168. Microwave radiation from generators 160 is introduced into the furnace through waveguides 158 to heat the feed material to reduce the iron oxide.

Iron oxides and many carbon bearing materials are excellent microwave absorbers and can be readily heated by microwave irradiation. Upon microwave heating, volatiles, primarily methane in the coal, are released into the off-gasses to form a portion of the syngas.

Continuous heating will cause the following reactions:

$$C+O_2=CO_2$$

$$CO_2+C=2CO$$

$$3Fe_2O_3+CO=2Fe_3O_4+CO_2$$

$$Fe_3O_4+CO=3FeO+CO_2$$

$$FeO+CO=Fe+CO_2$$

$$H_2O+C=CO+H_2$$

$$CO_2+CH_4^{Fe}\rightarrow 2CO+2H_2$$

$$H_2O+CH_4^{Fe}\rightarrow CO+3H_2$$

Thus, iron ore is reduced into metallic iron or DRI in the reduction zone 168. At the elevated temperature and carbon rich environment which are required for fast and complete iron ore reduction, most of the water and carbon dioxide are reacted with carbon to form hydrogen and carbon monoxide. The process is a continuous operation.

The produced DRI also function as a catalyst to promote the transformation of methane into hydrogen and carbon monoxide. The off-gases eventually reach a steady composition, a mixture of volatiles and iron ore reduction spent gas. Due to no oxygen or air required for combustion as in a ordinary gasifier or a combustion furnace, the off-gas composition can be readily controlled and a high quality syngas can be produced and collected.

The coal volatile content and the equilibrium phase diagram or iron oxides, iron, CO, and $CO_2$ vs. temperature can be used as references for controlling the off-gas composition. The exhaust port 166 can be located either near the feed material charging port or the product discharging port to form a countercurrent or concurrent flow. The countercurrent flow transfers gas heat better to the feed material and the concurrent flow generates a higher quality syngas.

After DRI is formed, the feed material becomes a poor microwave absorber due to formation of networked metallic iron. Therefore, the underling carbon layer or coating, preferably made of pyrolyzed carbon particles such as coke, graphite, activated carbon, or fly ash carbon in dry or slurry form, is layered or applied before charging iron ore agglomerates into the furnace by the dispenser 156. The carbon layer 155 or coating becomes the major microwave receptor/susceptor to be heated by microwave and to transfer heat to the above disposed DRI in the smelting zone.

The smelting zone 170 is separated from the reduction zone by refractory dividers 162 to reduce interference between the two zones. As an alternative, such carbon microwave receptor material can be applied over the agglomerates/DRI at an appropriate location. The carbon material is heated by microwave and transfers heat to the underneath agglomerates/DRI. A powdered poor microwave absorbing material also can be used to cover the agglomerates/DRI to reduce convection and radiation heat loss. The DRI's temperature continues to rise and the DRI reacts with the remaining internal carbon and the underlying or covering carbon to form molten iron nuggets and associated slag. The eutectic iron and carbon composition (4.26% C) helps to lower the melting point of the iron to 1154° C. The associated slag has a composition suitable for desulphurization and dephosphorization with lower melting point, lower viscosity, proper plasticity, and easy separation of iron nuggets from slag after cooling.

The remaining underlying carbon layer also functions as an isolator between the molten nuggets/slag and the refractory base to prevent erosion of the molten nuggets/slag to the refractory and facilitates discharging the produced nuggets/slag from the refractory base. If necessary, another refractory coating made of oxides, borides, carbides and/or nitrides can be applied between the carbon layer and the refractory base.

The produced iron nuggets can be used as a feed material for steelmaking by EAF or a feed material for ferrous foundries.

Because of no major combustion heating, the off-gas is of lower temperature and contains less particulate. The off-gas is passed through a cleaning system 164 to further cool down, remove and collect particulates in a container 172, recover and collect sulfur in a container 172, and separate $H_2O$ and $CO_2$ if any and necessary, becoming a syngas. Because of no steam and combustion requirements, the syngas production has fewer problems of $H_2O$ separation and $NO_x$ formation. The syngas can be used as a fuel for ordinary heating, a raw material for production of chemicals and liquid fuels, a hydrogen source after separation, a fuel to drive a power plant, or a reducing gas for iron ore reduction. Various heat exchangers can be installed along the line to utilize waste heat.

The invention claimed is:
1. A method of reducing iron oxide and concurrently generating a combustible syngas comprising charging a feed material including iron oxide mixed with coal which contains moisture and volatiles including primarily methane into a furnace chamber through an inlet port while sealing said furnace chamber against the entrance of air;
  dividing said furnace chamber into first and second zones, with said first zone having said inlet port receiving said feed material;
  irradiating said feed material with microwave radiation of a sufficient intensity to heat said iron oxide and said coal in said feed material so as to reduce iron oxide in said feed material by reaction of carbon therewith to produce $CO_2$ and CO from said $CO_2$ to continue reduction of iron oxide by reaction of CO therewith, producing direct reduced iron and carbon monoxide;
  transporting said direct reduced iron to said second zone in said furnace chamber where said reduced iron oxide in said feed material is heated to a higher temperature to be melted;

reacting carbon dioxide formed by reduction of said iron oxide by carbon monoxide with off gassed volatiles primarily methane from said coal in the presence of further heated direct reduced iron and molten iron as a catalyst in said second zone to form hydrogen and carbon monoxide gas, and reacting any moisture from coal with methane in the presence of said further heated direct reduced iron and molten iron as a catalyst and also reacting any moisture with unreacted carbon in said second zone to thereby also produce hydrogen and carbon monoxide gas to thereby generate said syngas comprised of a mixture of hydrogen and carbon monoxide as a by-product of the production of iron;

and discharging said molten iron from a product discharge port in said second zone and collecting and discharging said combustible syngas from an exhaust port in said second zone of said sealed furnace chamber adjacent said product discharge port to create a substantially concurrent flow through said furnace chamber of said gases with feed material, direct reduced iron and molten iron to promote said reactions producing said syngas.

2. The method according to claim 1 wherein said microwave irradiation is set to be not intensive enough to reduce any sulfur or phosphorus contained in said feed material.

3. The method according to claim 1 wherein said furnace chamber is annular and a matching annular hearth is rotated within said furnace chamber to carry feed material around said furnace chamber from said first zone to said second zone.

4. The method according to claim 1 wherein said furnace chamber extends linearly and a conveyor is disposed along said furnace chamber and said feed material is deposited at one end of said conveyor to carry feed material along said furnace chamber from said first zone to said second zone by said conveyor.

5. The method according to claim 1 wherein said reduced iron oxide in said feed material is heated sufficiently in said second zone to form iron nuggets.

\* \* \* \* \*